United States Patent Office 3,444,496
Patented May 13, 1969

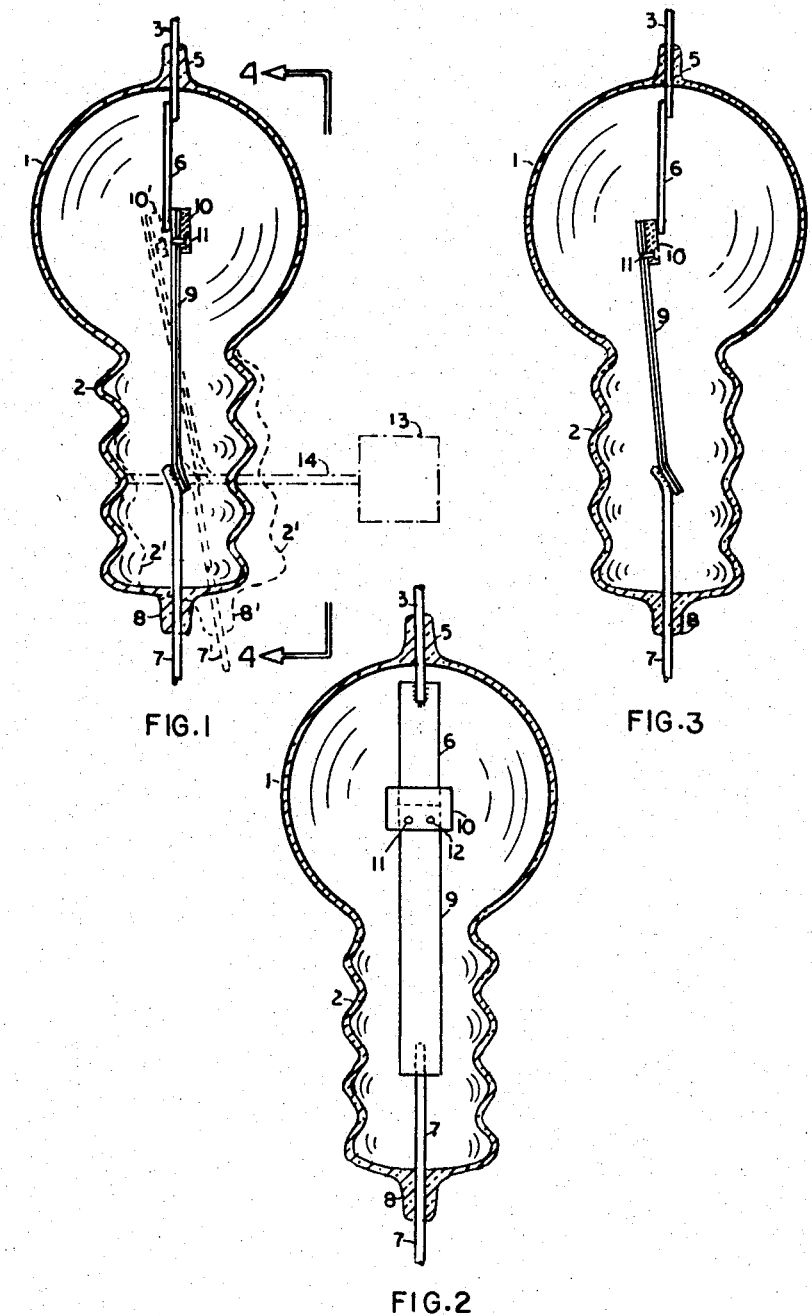

3,444,496
REPEATER THERMOSTAT
Henry Greber, 225 W. 80th St., Apt. 8–D,
New York, N.Y. 10024
Filed Aug. 9, 1967, Ser. No. 659,843
Int. Cl. H01h 61/01, 71/16, 71/02
U.S. Cl. 337—91                     5 Claims

ABSTRACT OF THE DISCLOSURE

A resettable thermostat for controlling a circuit in which a bimetal member and a spring member each have a contact surface at their free ends in overlapping circuit closing engagement. The contact surfaces are separated and the circuit opened by movement of the bimetal beyond and to the other side of said spring member. Insulation on the end surface of the bimetal opposite the contact surface is interposed between the members when they re-engage to maintain the circuit open. Means in the form of a flexible portion on the enclosure is provided for returning the members to a closed circuit position.

---

This invention relates to a resettable thermostat for protection of electrical circuits against short circuits and overloads. The thermostat consist of an enclosure containing a bimetallic strip electrode, which is in contact with another springy beryllium-copper electrode. The bimetallic strip is provided with an insulating plate on its side opposite to the contact surface. When the bimetallic strip expands due to excessive current, it bends and pushes ahead of itself the springy electrode, so that said insulating plate inserts itself between the two electrodes. Through bending a bellows, which constitutes a part of the thermostat enclosure the electrodes can be brought to their initial position. The bending can be performed manually, or by electromagnetic means.

As stated in the summary, the thermostat is connected in series with the load in the electric circuit, and therefore serves as a circuit breaker, or fuse substitute. For low voltage circuits the thermostat can be filled with air. For high voltage circuits, sulphur-hexafluoride gas, oil, or vacuum must be applied in the thermostat.

FIGURE 1 is a cross section of this repeater thermostat. FIGURE 2 is a cross sectional view taken along line 4—4 indicated in FIGURE 1. FIGURE 3 is the same cross section as shown in FIGURE 1, except that the thermostat is shown in open position.

The enclosure of the thermostate consists of a bulb-shaped part 1 and a bellows shaped part 2. Each of these parts contains one lead-in conductor. Conductor 3 enters bulb 1 through a seal 5. To conductor 3 is fastened by means of welding, leaf-spring 6, made of beryllium-copper. Similarly, conductor 7 enters the bellow-shaped part 2 of the enclosure, through seal 8. To this conductor 7, is welded the bimetallic strip 9, which is in metallic contact with said leaf spring electrode 6, when the thermostat is closed. Said bimetallic strip carries the insulating plate, which is fastened to strip 9 by means of bolts 11 and 12. In FIGURE 1, only bolt 11 is visible. By means of the dotted lines bellow 2 is shown in its bent position, which is designated with 2'. Similarly seal 8 is designated in the bent position of the bellow with the numeral 8'. In the same way parts 7, 9, and 10 are designated with the numerals 7', 9', 10', in the bent position. In the same FIGURE 1, which is the principal figure of this specification, dash-dotted lines delineate diagrammatically electromagnetic means 13, serving to bend bellow 2 into position 2'. Electromagnetic means 13, may consist in a solenoid acting on bellows 2 through the intermediary of bar 14, also shown diagrammatically. A given detail shown in FIGURE 1 is designated with the same numerals in the two other figures, which serve merely for greater clarity.

FIGURE 2 is a cross section of this repeater thermostat taken along line 4—4, indicated in FIGURE 1. In this figure it can be clearly seen that conductor 5 is welded to the beryllium leaf spring electrode 6. It can also be seen that the insulating plate 10, made of porcelain or mica, and whose thickness depends on the applied voltage, is fastened to bimetallic strip 9, by means of bolts 11, and 12. Bimetallic strip 9 is connected by welding, or by other suitable means, to conductor 7.

FIGURE 3 serves to show the thermostat in open position with the insulating plate 10 inserted between the electrodes 6 and 9.

The mode of operation of this repeater thermostat consists in that when the thermostat carries an excessive current, be it a short circuit or an overload current, the bimetallic strip is bent, and as it bends it pushes ahead of itself leaf spring 6. After some bending in direction of movement of the bimetallic strip, the leaf spring snaps back, and in doing so enclosed between itself and the bimetallic strip, the insulating plate 10. While any bimetallic strips can be applied in this repeater thermostat, those with snap-action are preferable. It is also clear that the enclosure can be made not only of glass, but also of plastic. The bellows shown in the drawing is not indispensable and can be replaced with a tube, if the glass or plastic used is sufficiently elastic to allow for the resetting movement. The electromagnetic means, may act not only mechanically by means of pushing or pulling the bellow, or tube, but may attract electromagnetically either conductor 6, 9 or 7, provided that any of these conductors is made of ferromagnetic material such as iron or nickel.

It is clear, that many modifications, alterations and variations of this repeater thermostat and of its modes of application for low and high voltage circuits can be made, in the spirit of this invention.

I claim:
1. A repeater thermostatic switch comprising, and enclosure, sealing means, a pair of electrodes extending through said sealing means into said enclosure, one of said electrodes comprising a flexible, leaf-spring member having an electric contact surface on its free end, the other of said electrodes comprising a bimetallic member provided with an electric contact surface on its free end, an insulating plate mounted on the free end of one of said members on a surface opposite said contact surface, said contact surfaces being in overlapping engagement when said switch is closed, heating of said bimetal member by excessive current flow therethrough causes said bimetal member to bend along a predetermined path and to carry the spring member along said path until said spring member slips over the end of said bimetalic member and snap into engagement with the opposite side thereof to separate said contact surfaces and open said switch, said switch being maintained in open condition by the interposition of said insulating plate between said members, and reset means comprising a tubular flexible portion of said enclosure, said contact surfaces and said members being returned to the closed initial position by flexure of said reset means.

2. A repeater thermostatic switch as set forth in claim 1 in which said insulating plate is mounted on said bimetallic member.

3. A repeater thermostatic switch as set forth in claim 1 in which said reset means includes an electromagnetic means in the form of a solenoid.

4. A repeater themostatic switch as set forth in claim 1 in which said bimetallic member and said spring member are cantilever mounted.

5. A repeater thermostatic switch as set forth in claim 4 in which said members are coaxially aligned.

References Cited

UNITED STATES PATENTS

| 1,891,752 | 12/1932 | Coyne | 200—153.14 |
| 2,751,462 | 6/1956 | Markowite | 337—112 |

G. HARRIS, *Primary Examiner.*

R. L. COHOS, *Assistant Examiner.*

U.S. Cl. X.R.

200—153; 337—112